United States Patent
Courtin et al.

(10) Patent No.: US 8,402,605 B2
(45) Date of Patent: Mar. 26, 2013

(54) FASTENER FOR FIXING A MAT TO A CARPET

(75) Inventors: Christian Courtin, Vaureal (FR); Laurent Huet, Meru (FR); Jesse Jensen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 263 days.

(21) Appl. No.: 12/747,916

(22) PCT Filed: Dec. 9, 2008

(86) PCT No.: PCT/US2008/086017
§ 371 (c)(1),
(2), (4) Date: Aug. 2, 2010

(87) PCT Pub. No.: WO2009/076333
PCT Pub. Date: Jun. 18, 2009

(65) Prior Publication Data
US 2010/0287748 A1   Nov. 18, 2010

(30) Foreign Application Priority Data
Dec. 13, 2007  (FR) ..................... 07 59813

(51) Int. Cl.
*A47G 27/04* (2006.01)
(52) U.S. Cl. .............. 16/4; 16/8; 24/662; 296/97.23; 411/508
(58) Field of Classification Search .......... 16/4, 8; 24/700, 662, 297, 453, 586.11, 581.11, 694; 411/344, 508–510, 913; 296/97.23; 52/506.05
See application file for complete search history.

(56) References Cited

U.S. PATENT DOCUMENTS

| | | | |
|---|---|---|---|
| 5,775,859 A * | 7/1998 | Anscher | 411/38 |
| 6,497,003 B2 | 12/2002 | Calabrese | |
| 6,757,945 B2 | 7/2004 | Shibuya et al. | |
| 7,540,066 B2 * | 6/2009 | Aoki et al. | 16/4 |
| 7,546,661 B2 * | 6/2009 | Connor, Jr. | 16/4 |
| 7,945,992 B2 * | 5/2011 | Parisi et al. | 16/4 |
| 8,122,567 B2 * | 2/2012 | Connor, Jr. | 16/4 |

(Continued)

FOREIGN PATENT DOCUMENTS

| DE | 19617408 A1 | 8/1997 |
|---|---|---|
| DE | 20021880 U1 | 3/2001 |

(Continued)

OTHER PUBLICATIONS

ISR for PCT/US2008/086017 dated Mar. 5, 2009.

(Continued)

*Primary Examiner* — William L. Miller
(74) *Attorney, Agent, or Firm* — Lowe Hauptman Ham & Berner LLP

(57) ABSTRACT

A fastener for fixing a mat to a carpet includes a female element having a cap and a female eyelet to sandwich a mat therebetween. A base element is engageable with the female element and includes a carpet holding arrangement for holding a carpet. The base element includes an enlarged head provided with an annular groove. The female eyelet includes at least two studs projecting inward, and deformable arms each of which extends between two adjacent studs transversely to a direction of pushing the head of the base element into the female eyelet. Each arm has a central portion disposed in the annular groove when the female element is engaged with the base element.

19 Claims, 7 Drawing Sheets

U.S. PATENT DOCUMENTS

| | | |
|---|---|---|
| 2007/0011844 A1 | 1/2007 | Aoki et al. |
| 2009/0151135 A1* | 6/2009 | Park .............................. 24/453 |
| 2010/0122429 A1* | 5/2010 | Gonzalez et al. ................ 16/4 |
| 2010/0212119 A1* | 8/2010 | Dendo ............................ 24/453 |

FOREIGN PATENT DOCUMENTS

| | | | |
|---|---|---|---|
| EP | 1219495 | A1 | 7/2002 |
| EP | 1980444 | A2 | 10/2008 |
| EP | 2223637 | A1 * | 9/2010 |
| FR | 2801852 | A1 | 6/2001 |
| WO | WO 2011033482 | A1 * | 3/2011 |

OTHER PUBLICATIONS

French Search Report for FR 0759813 dated Jul. 8, 2008.

* cited by examiner

FASTENER FOR FIXING A MAT TO A CARPET

RELATED APPLICATIONS

The present application is national phase of International Application No. PCT/US2008/086017, filed on Dec. 9, 2008, and claims priority from, French Application Number 0759813, filed Dec. 13, 2007, the disclosures of which are hereby incorporated by reference herein in their entirety.

TECHNICAL FIELD

The disclosure related to fasteners for fixing a mat to a carpet, particularly in an automobile vehicle.

BACKGROUND

Known fasteners of this kind include a base element sandwiching the carpet and a female element sandwiching the mat. The base element includes a head that projects from the carpet and the female element is adapted to cooperate with the head of the base element to fix the mat to the carpet.

DE 196 17 408 describes such fasteners. The head of the base element is mushroom-shaped and includes a shoulder. The female element has a series of teeth one end of which is attached to the rest of the female element and the free end of which is hook-shaped. The teeth have a height that enables them to flex. When the female element is moved toward the base element, and thus when the teeth are moved toward the head, the free ends are pushed back and then locate on the shoulder.

SUMMARY

The disclosed embodiments aim to provide a fastener of improved performance.

One embodiment proposes a fastener for fixing a mat to a carpet, including:
- a base element including a male eyelet and a locking ring, said male eyelet having a flange, a mushroom-shaped head provided with an annular groove and projecting from a first side of said flange, and a skirt disposed on a second side of said flange opposite said first side, said flange being adapted to be positioned against a first face of said carpet, said locking ring having a flange adapted to be positioned against a second face of said carpet opposite said first face, said skirt and said ring including mutual attachment means for sandwiching said carpet between said flanges, and
- a female element including a female eyelet and a cap, said female eyelet having an annular rib and a flange extending radially around one end of said rib and being adapted to be positioned against a first face of said mat, said cap having a skirt and a flange projecting from said skirt and adapted to be positioned against a second face of said carpet opposite said first face, said annular rib and said skirt including mutual attachment means for sandwiching said mat between their said respective flanges, said female element having a release position in which it is disposed away from said base element and a fixing position in which it is placed over said head of said base element, characterized in that said female element includes on the interior surface of said annular rib at least two studs projecting inward and deformable arms, each of said arms extending between two consecutive studs transversely to the direction of pushing said female element from said release position to said fixing position, each of said arms having a central portion disposed in said annular groove when said female element is in the fixing position on said base element, and each of said arms being adapted to be deformed during pushing so that they move apart and then locate in said annular groove.

The arms are attached at both ends to the rest of the female eyelet but are adapted to be deformed in the plane in which they lie so that, when pushed, as soon as the arms touch the head, they are deformed and their central portions move toward the interior surface of the rib. Once past the head, the central portions of the arms resume their rest position and locate in the annular groove.

The thickness of the arms is thus limited to that of the groove in the head of the base element, which helps to limit the general thickness of the fastener. For fixing, it suffices for the arms to be slightly deformed, which requires a minimum force while the pull-out force remains sufficiently high.

According to implementation features that are particularly simple and convenient as much for fabrication as for use:
- said head includes a base and a cap delimiting said groove;
- in the female eyelet, said arms are disposed at substantially the same level as said flange;
- each of said studs has a front surface parallel to said interior surface and spaced from that interior surface and a transverse surface adjoining said flange, the corner formed between said front surface and said transverse surface being rounded;
- the thickness of each of said studs between said interior surface and said front surface is determined so that said head passes tangentially between said front surfaces when said female element passes from said release position to said fixing position;
- each of said studs has two lateral surfaces, each disposed between said interior surface of said rib and said front surface, each of said arms being rooted at each end on one of said lateral surfaces;
- each end of each of said arms is further rooted on a portion of said interior surface adjacent to said lateral surface on which that end is also rooted;
- said female eyelet is in one piece;
- said interior surface of said skirt of said cap and said exterior surface of said rib of said female eyelet each have a series of notches belonging to said mutual attachment means of said female element;
- each of said arms has a half-moon-shaped cross section, the face that is straight when seen in section facing said interior face, the face that is curved when seen in section being disposed opposite said straight face;
- said female eyelet includes three studs regularly distributed over said interior surface of said annular rib;
- each of said arms is slightly curved, with its convex side facing said interior surface;
- said flange of said ring extends around a central orifice, said ring also having on its perimeter bordering said central orifice a series of teeth having a pointed end projecting inward, and in that the exterior surface of said skirt of said male eyelet has a plurality of notches extending parallel to each other and to said flange, said mutual attachment means of said base element including said teeth and said notches; and/or
- said locking ring, said male eyelet, said female eyelet and said cap are each molded in one piece from plastic material.

According to another embodiment, a fastener for fixing a mat to a carpet includes:

a female element having a cap and a female eyelet to sandwich a mat there between; and a base element engageable with the female element and including a snap-over connection to fasten a carpet on the base element.

According to another embodiment, a fastener for fixing a mat to a carpet includes:

a female element having a cap and a female eyelet to sandwich a mat therebetween;

a base element engageable with the female element and including a carpet holding arrangement for holding a carpet; wherein the base element comprises an enlarged head provided with an annular groove;

the female eyelet comprises at least two studs projecting inward, and deformable arms each of which extends between two adjacent said studs transversely to a direction of pushing said head of the base element into said female eyelet, each of said arms having a central portion disposed in said annular groove when said female element is engaged with the base element.

DESCRIPTION OF DRAWINGS

Features and advantages of disclosed embodiments will emerge from the following description, given by way of preferred but nonlimiting example with reference to the appended drawings, in which.

DETAILED DESCRIPTION

Figure 1:
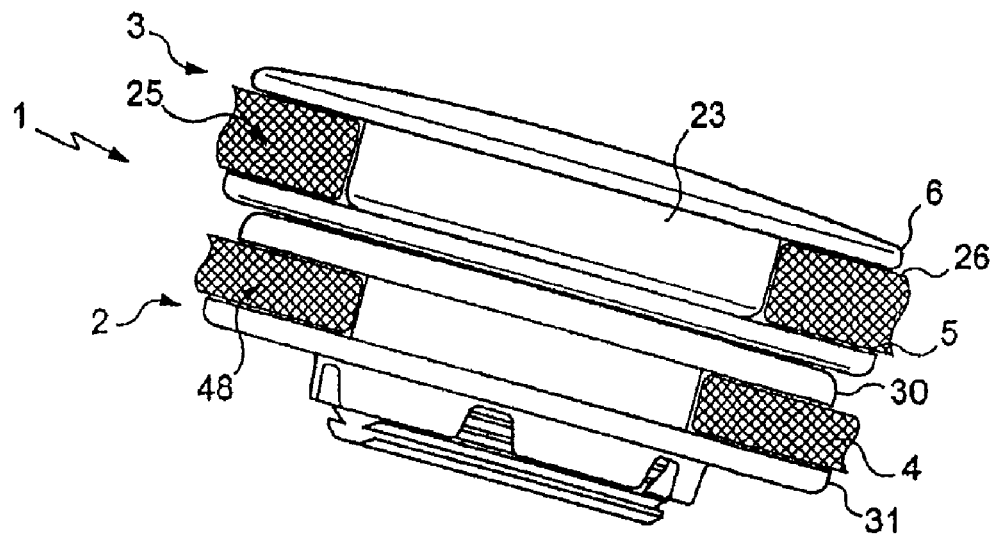
FIG. 1 is a perspective view of the fastener of a first embodiment, the female element being in a fixing position on the base element.
Figure 2:
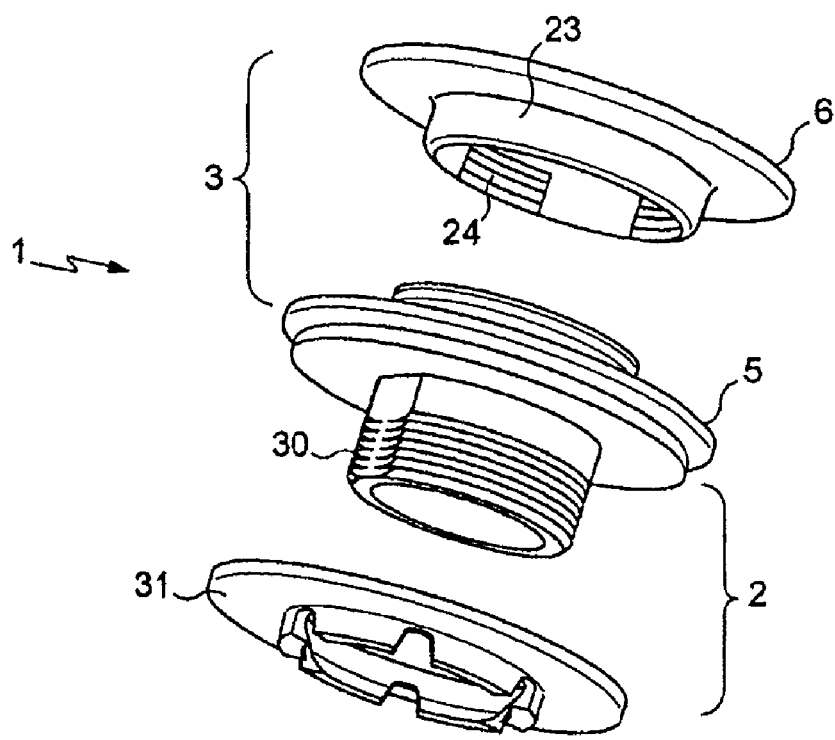
FIG. 2 is an exploded view of the fastener from FIG. 1.
Figure 3:
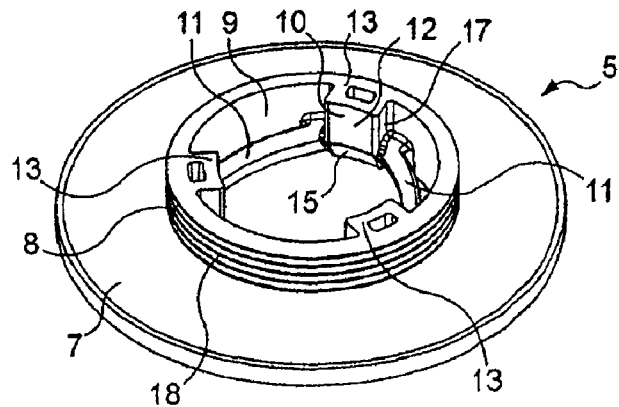
FIG. 3 is a perspective view of the female eyelet of the first embodiment.

In the first embodiment of the FIGS. 1-13, the mat fixing fastener 1 includes a base element 2 and a female element 3.

The base element 2 is configured to be fixed to a carpet 4, at the perimeter of an orifice provided for this purpose in the carpet 4.

The female element 3 includes a female eyelet 5 and a cap 6.

The fastener 1 and its various components are all molded from plastic material.

The female eyelet 5 includes a flat annular flange 7 having a central circular orifice along the perimeter of which an annular rib 8 extends. This rib 8 is on only one side of the flange 7. The rib 8 has a thickness comparable to that of the flange 7 and a height of about twice the thickness of the flange 7. The exterior surface of the rib 8 is notched (the series of notches 18 has a sawtooth profile) whereas the interior surface 9 of this rib 8 is smooth.

The rib 8 has a distal end opposite the flange 7 and a proximal end that is situated in the same plane as the flange 7.

The female eyelet 5 further includes three studs 10 and three arms 11.

Each stud 10 is rooted on the interior surface 9 of the rib 8; the three studs 10 are regularly distributed on this interior surface 9, i.e. they are disposed at angular intervals of 120°.

Each stud 10 has a parallelepiped shape that extends from the distal end to the proximal end.

Each stud 10 has a front surface 12 spaced from and parallel to the rib 8 and a first transverse surface 13 and a second transverse surface 14, the surface 13 lying in the plane containing the distal end of the rib 8 whereas the surface 14 lies in the plane containing the proximal end of the rib 8.

The corner formed between the front surface 12 and the transverse surface 14 is rounded so that each stud 10 has a slope 15.

Each stud 10 also includes an orifice 16 that extends in the direction from the surface 13 to the surface 14 and opens onto the surface 13. This orifice limits the quantity of plastic material used to fabricate the female eyelet 5, prevents the formation of shrink marks in the corresponding relatively thick area, and enables slight deformation of the studs 10.

Finally, each stud 10 has two lateral surfaces 17.

The female eyelet 5 further includes the three arms 11. Each arm 11 extends between two successive studs 10.

Each arm 11 has two ends, each rooted on a lateral surface 17 of a stud 10 and on a portion of the interior surface 9 of the rib 8 adjacent to the lateral surface 17.

Figure 13:
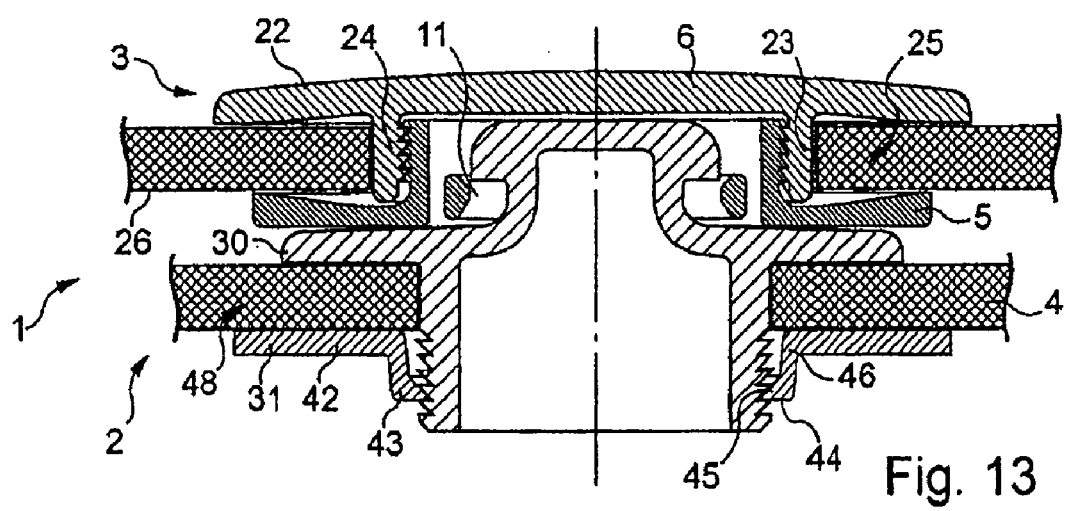
FIG. 13 is a view in axial section of the fastener from FIG. 1.

The arms 11 have a thickness substantially equivalent to the thickness of the flange 7 and they lie inside the cylindrical space defined by the rib 8 at the same level as the flange 7. As can be seen in FIG. 13, each arm has when seen in section a half-moon shape with a lateral surface that is curved in section and a lateral surface that is flat in section, parallel to and facing the rib 8. The curved surface of the arms 11 is that facing the axis of the female eyelet 5.

Each arm 11 extends from one stud 10 to the next stud 10 in a direction that is virtually rectilinear but has a very slight curvature so that the central portion 19 of each arm 11 is closer to the groove 8.

Figure 4:
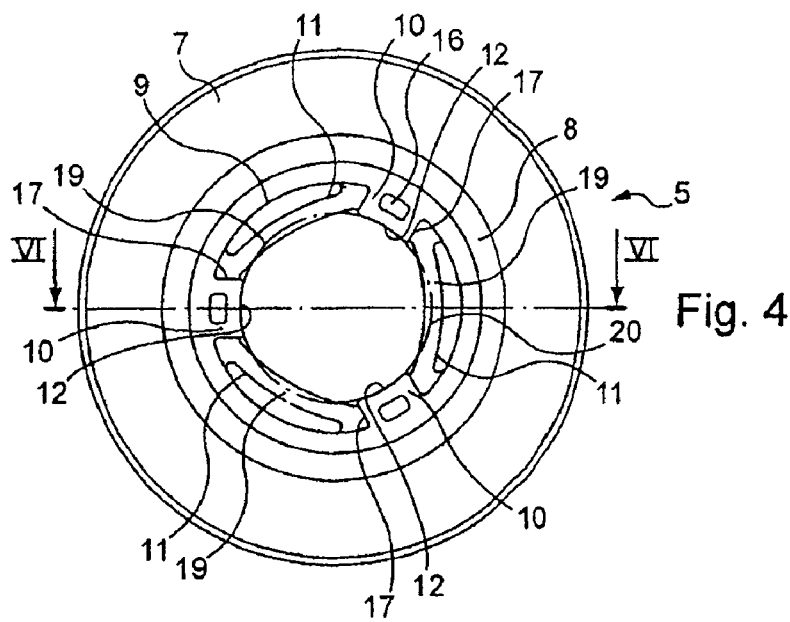
FIG. 4 is a bottom view of the eyelet from FIG. 3.
Figure 5:
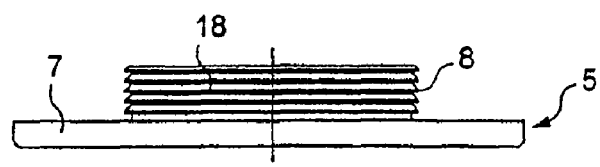
FIG. 5 is an elevation view of that eyelet.
Figure 6:
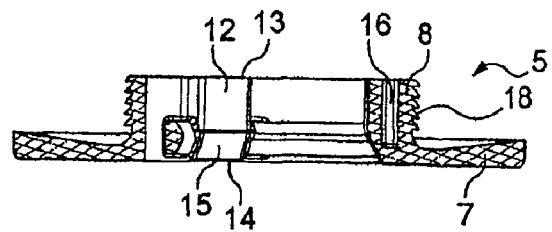
FIG. 6 is a view of that eyelet in section taken along the line VI-VI in FIG. 4.

As can be seen in FIG. 4, the inscribed circle 20 of the three front surfaces 12 of the studs 10 is not tangential to the arm 11; the central portions 19 of the arms 11, on the curved surface side, are located inside the inscribed circle 20.

The exterior surface of the rib 8 has a series of superposed annular notches extending the full height of the rib 8, each notch having a slope so that the diameter of each notch increases in the direction from the distal end to the proximal end as far as a shoulder that defines the beginning of the next notch. Here height means in the axial direction of the fastener.

Figure 7:
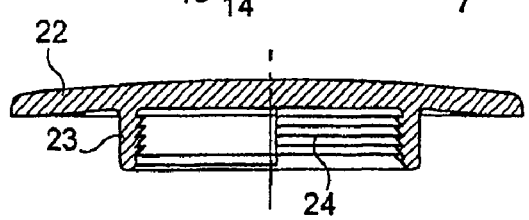
FIG. 7 is a view in axial section of the cap of the first embodiment.
Figure 8:
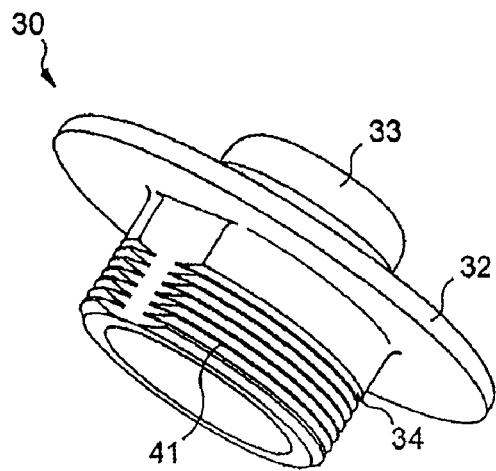
FIG. 8 is a perspective view of the male eyelet of the first embodiment.
Figure 10:
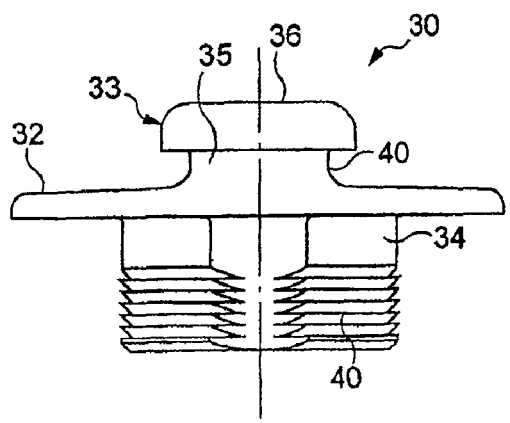
FIG. 10 is an elevation view of that male eyelet.
Figure 9:
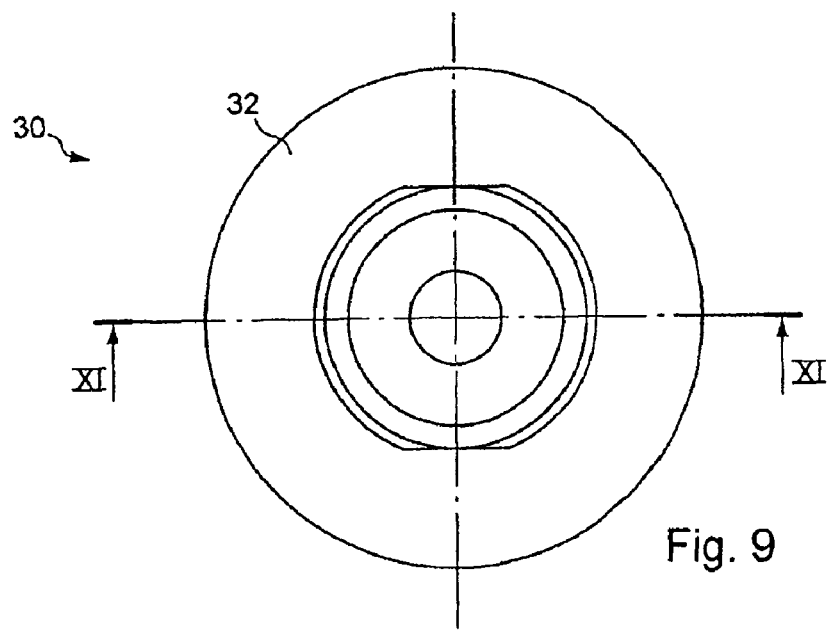
FIG. 9 is a bottom view of the male eyelet from FIG. 8.
Figure 11:
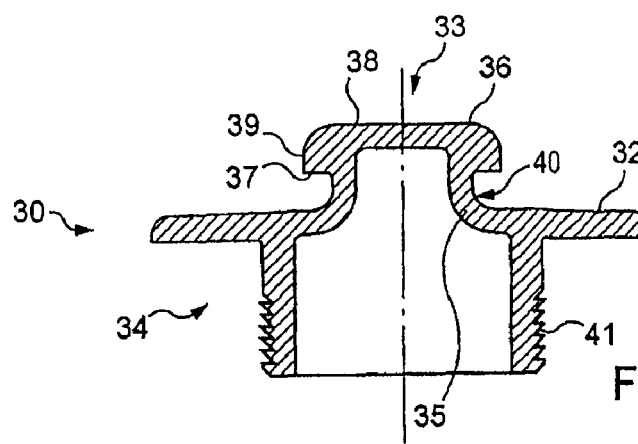
FIG. 11 is a view of that eyelet in section taken along the line XI-XI in FIG. 9.
Figure 12:
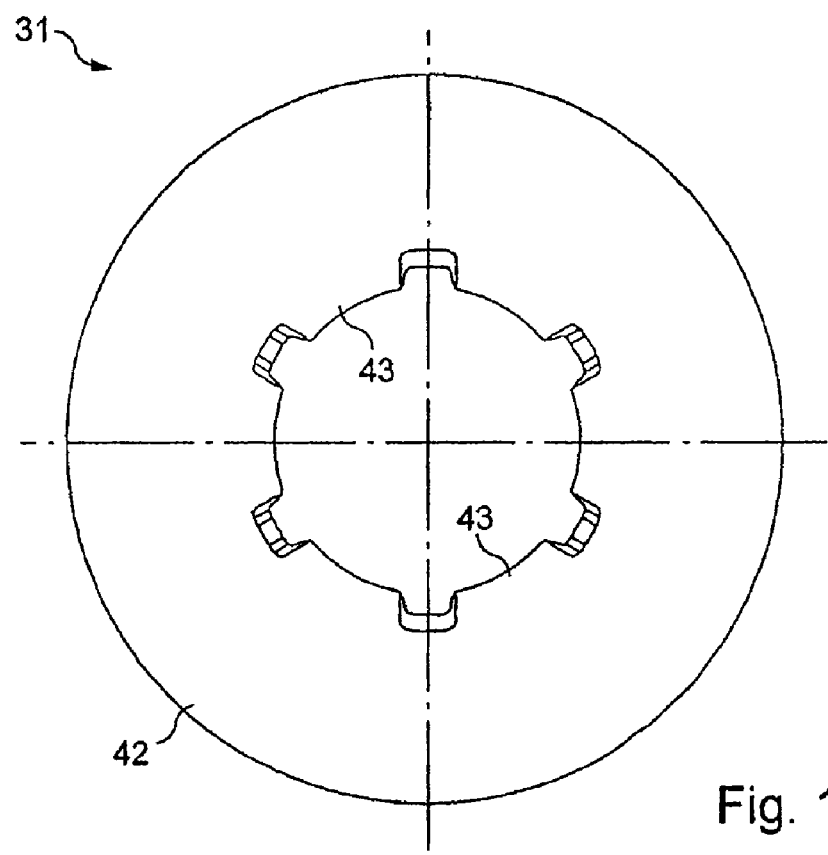
FIG. 12 is a view in elevation of the locking ring seen from below with the FIG. 1 orientation of the fastener.

Referring to FIG. 7, the cap 6 has a flange 22 and an annular skirt 23. The flange 22 has a solid disc shape and its circular contour has a diameter equivalent to that of the flange 7. The thickness of the flange 22 is globally equivalent to that of the flange 7. Here the flange 22 has a shape that is slightly domed at its center.

The annular skirt 23, the height of which corresponds to the height of the rib 8, is rooted on the concave surface of the flange 22.

The interior surface 9 of the skirt 23 has a diameter corresponding to the diameter of the exterior surface of the rib 8.

Four series 24 of notches are provided on this interior surface 9 of the skirt 23. These series 24 consist of superposed slopes and shoulders adapted to cooperate with the notched exterior surface of the rib 8. The interior surface 9 of the skirt 23 carries a circumferential alternation of series 24 of notches and smooth portions.

In other embodiments, not shown, the notches extend over the whole periphery of the interior surface 9 of the skirt 23 or a different number of series of notches can be provided, for example three series.

When the cap 6 is placed on the female eyelet 5, the flange 7 and the annular portion of the flange 22 projecting relative to the skirt 23 form with the exterior surface of the skirt 23 a peripheral groove 25 having a height such that the groove 25 accepts the edge of a mat 26 bordering a circular orifice in the mat 26.

The base element 2 includes a male eyelet 30 and a locking ring 31.

The male eyelet 30 includes a flange 32, a mushroom-shaped head 33, and a skirt 34.

The flange 32 is flat and has a thickness corresponding to the thickness of the flange 7 and a diameter slightly less than that of the flange 7. The flange 32 extends around a central circular orifice smaller than the central orifice of the female eyelet 5. The head 33, which projects from one side of the flange 32, is rooted at the perimeter of this central orifice.

The head 33 has a height corresponding to the height of the rib 8.

The head 33 has a base 35 formed of a lateral wall that extends transversely to the plane of the flange 32. The base 35 is cylindrical and has a height globally comparable to the thickness of the flange 32.

The head 33 also includes a cap 36. This projects radially relative to the base 35. The surface 37 of the cap 36 that faces the flange 32 is transverse to the base 35.

The cap 36 has a flat upper surface 38 and annular lateral surface 39 transverse to the lower surface 37. The corner formed between the upper surface 38 and the lateral surface 39 is rounded and so the base 35 and the cap 36 have a mushroom shape. The surface 37 forms a shoulder between the cap 36 and the base 35.

The male eyelet 30 includes an annular groove 40 delimited by the cap 36, the base 35 and the flange 32.

The circular orifice at the center of the flange 32 extends into the head 33 and the cap 36 therefore has only a thickness equivalent to that of the flange 32.

The skirt 34 extends from the side of the flange 32 opposite that from which the head 33 extends.

This skirt 34 has a height which here is of the order of twice the height of the head 33. It is cylindrical and has an inside diameter that globally corresponds to the outside diameter of the cap 36.

The interior surface of the skirt 34 is smooth whereas its exterior surface has over a first half of its height adjoining the flange 32 a smooth surface and over the rest of that surface notches 41 having a succession of slopes and shoulders similar to those of the rib 8 of the female eyelet 5. The slopes are oriented so that the diameter increases toward the flange 32.

The skirt 34 has a flat on each of two diametrically opposite portions of the exterior of the skirt 34. The notches 41 stop at the flats and so the notches 41 are not annular but simply virtually semicircular.

The locking ring 31 (FIG. 12) includes a flange 42 similar to the flange 7 of the female eyelet 5 and which extends around a circular orifice the diameter of which corresponds to the outside diameter of the skirt 34 of the male eyelet 30.

Rooted on one side of the flange 42 are six teeth 43 that extend regularly along the perimeter of the orifice inside the flange 42. Each tooth 43 is separated from the adjacent teeth 43 by a small gap. The teeth 43 extend over a height slightly greater than the thickness of the flange 42. The teeth 43 are slightly rounded so as to follow the contour of the flange 42.

Each tooth 43 terminates in a pointed section that is oriented toward the axis of the ring 31. Thus each tooth 43 has an edge surface 44 opposite the flange 42 which is flat and parallel to the plane of the flange 42.

The interior surface of the teeth 43, i.e. the surface that faces the axis of the ring 31, has a first portion 45 which slopes and is at an acute angle to the surface 44 whereas on the same side as the flange 42 the interior surface of the teeth 43 has a second portion 46 that is transverse to the flange 42.

The diameter of the interior orifice of the flange 42 and the radial position of the pointed ends of the teeth 43 are designed to enable those pointed ends to be accommodated between the notches 41 in the likewise pointed depressions formed between the shoulders and the slopes of the skirt 34 of the male eyelet 30.

When the locking ring 31 is placed on the male eyelet 30, the eyelet 30 and the ring 31, through the flange 32, the portion of the skirt 34 disposed on the same side as the flange 32, and the flange 42, a peripheral groove 48 adapted to accommodate an edge of the carpet 4 that borders a circular orifice in the carpet 4.

Fitting the fastener for fixing a mat 26 to a carpet 4 is described next, the mat 26 and the carpet 4 being provided with circular orifices for this purpose.

To fit the base element 2, the male eyelet 30 is placed on the carpet 4 with the skirt 34 passing through the orifice in the carpet 4 and the surface of the flange 32 on the same side as the skirt 34 coming into contact with the carpet 4.

In the thickness direction, the carpet 4 occupies the portion of the skirt 34 whose exterior surface is smooth.

The notched surface of the skirt 34 projects from the other side of the carpet 4 and the ring 31 is fixed to the skirt 34 by positioning the flange 42 against the carpet 4 with the teeth 43 cooperating with the notched surface of the skirt 34. The pointed ends of the teeth 43 take up a position in one or the other of the notches provided on the skirt 34, depending on the thickness of the carpet.

The peripheral groove 48 of the base element 2 therefore accepts the perimeter of the orifice in the carpet 4, and the carpet 4 is sandwiched between the flanges 32, 42.

In a different embodiment, the locking ring 31 is placed around the orifice in the carpet 4 and then the male eyelet 30 is moved toward that orifice, passing the skirt 34 through the orifice and then through the ring 31 until the flange 32 is positioned against the carpet with the teeth 43 disposed in the notches of the skirt 34.

To fit the female element 3 to the mat 26, the skirt 23 of the cap 6 is passed through the mat 26 so that the flange 22 is positioned against the contour of the orifice in the mat 26, which is sandwiched between the flanges 7, 22.

Once the cap 6 is correctly positioned, which can be verified by looking from the other side of the mat 26 through the orifice in the mat 26, the rib 8 is pressed into the skirt 23 with the notches of the rib 8 on its exterior surface cooperating with those of the interior surface 9 of the skirt 23 of the cap 6. The peripheral groove 25 of the female element 3 therefore accepts the perimeter of the orifice in the mat 26.

To fix the mat 26 to the carpet 4, the female element 3 is moved toward the base element 2. The female element 3 is then in the release position, whereas when the female element is positioned on the head of the base element it is in a fixing position.

During this movement, the head 33 and the arms 11 and studs 10 come into contact with each other first.

When the female element 3 is moved toward the base element 2 along an axis common to the two elements 2, 3, the arms 11 come into contact with the lateral surface 39 of the cap 36 of the head 33.

The front surfaces 12 of the studs 10 are positioned so that the inscribed circle for those surfaces 12 corresponds to the greatest diameter of the head 33, i.e. the diameter at the level of the shoulder between the head 33 and the base 35.

On moving forward against the head 33, the central portions 19 of the arms 11 are moved apart slightly because of the rounded shape of the lateral surface 39 of the cap 36, to a maximum separation that is reached at the lower edge of the surface 39 (i.e. that on the same side as the flange 32).

When the arms 11 move beyond the head 33 and face the base 35, because of the shoulder, the overall size of the head 33 decreases and the arms 11 can return to a rest position in which there cannot be inscribed a circle of diameter corresponding to the largest diameter of the head 33. The arms are therefore disposed in the annular groove 40.

As the lower surface 37 of the cap 36 is plane and the upper surface of the arms 11 has a plane portion (before the bending which gives it its half-moon shape in section) and are one against the other in the central portion 19 of the arms 11, pulling along the axis of the fastener 1 does not deform the arms 11 and therefore prevents the female element 3 from being pulled out relative to the base element 2.

As the studs 10 extend the full height of the rib 8, their front surfaces 12 remain in contact with a portion of the lateral surface 39 of the cap 36, which locks the female eyelet 5 radially relative to the male eyelet 30.

If the female element 3 is moved toward the base element 2 with an offset between the axes of the two elements 2, 3, at least one of the studs 10 comes into contact with the cap 36 via its sloping surface 15.

Because of the slope 15 and the mushroom shape of the cap 36, pressure exerted on the female element 3 relative to the base element 2 causes movement of the stud 10 in contact with the cap 36 toward the periphery of the cap 36 until the front surface 12 of the stud 10 is in contact with the lateral surface 39 of the cap 36.

The front surfaces 12 of each of the studs 10 are then in contact with the lateral surface 39 and the remainder of the fixing process is the same as before.

If two studs 10 come into contact with the cap 36, the effects of the two slopes 15 will have the same consequences as before, i.e. the two studs 10 will be directed toward the periphery of the cap 36.

Thanks to this form of assembly, the force for fixing the female eyelet 5 to the male eyelet 30, i.e. the force for fixing the female element 3 to the base element 2, is moderate although good resistance to pulling out is guaranteed.

Thanks to its arms 11, which lie in and are deformed in the plane of the flange 7 of the female eyelet 5, the fastener is of limited thickness.

Should shear forces be applied to the fastener 1, the presence of the studs 10 prevents crushing of one or both arms 11 and therefore release of the last arm 11 that would allow release of the female element 3.

In embodiments not shown, the notches provided on the surfaces for fixing the male eyelet 30 to the ring 31 and the female eyelet 5 to the cap 6 have different shapes and a different number of notches, for example fewer notches.

In a further variant, the female eyelet is fixed to the cap 6 and the male eyelet is fixed to the ring 31 by means of internal and external threads for a screwed fixing.

According to a further variant, a different number of studs is provided, for example four studs regularly distributed on the interior surface 9 of the rib of the female element or two diametrically opposite studs. In the case of two studs, the arms have a length close to half the circumference of the interior surface of the rib and have a shape that is close to a semicircle.

Figure 14:
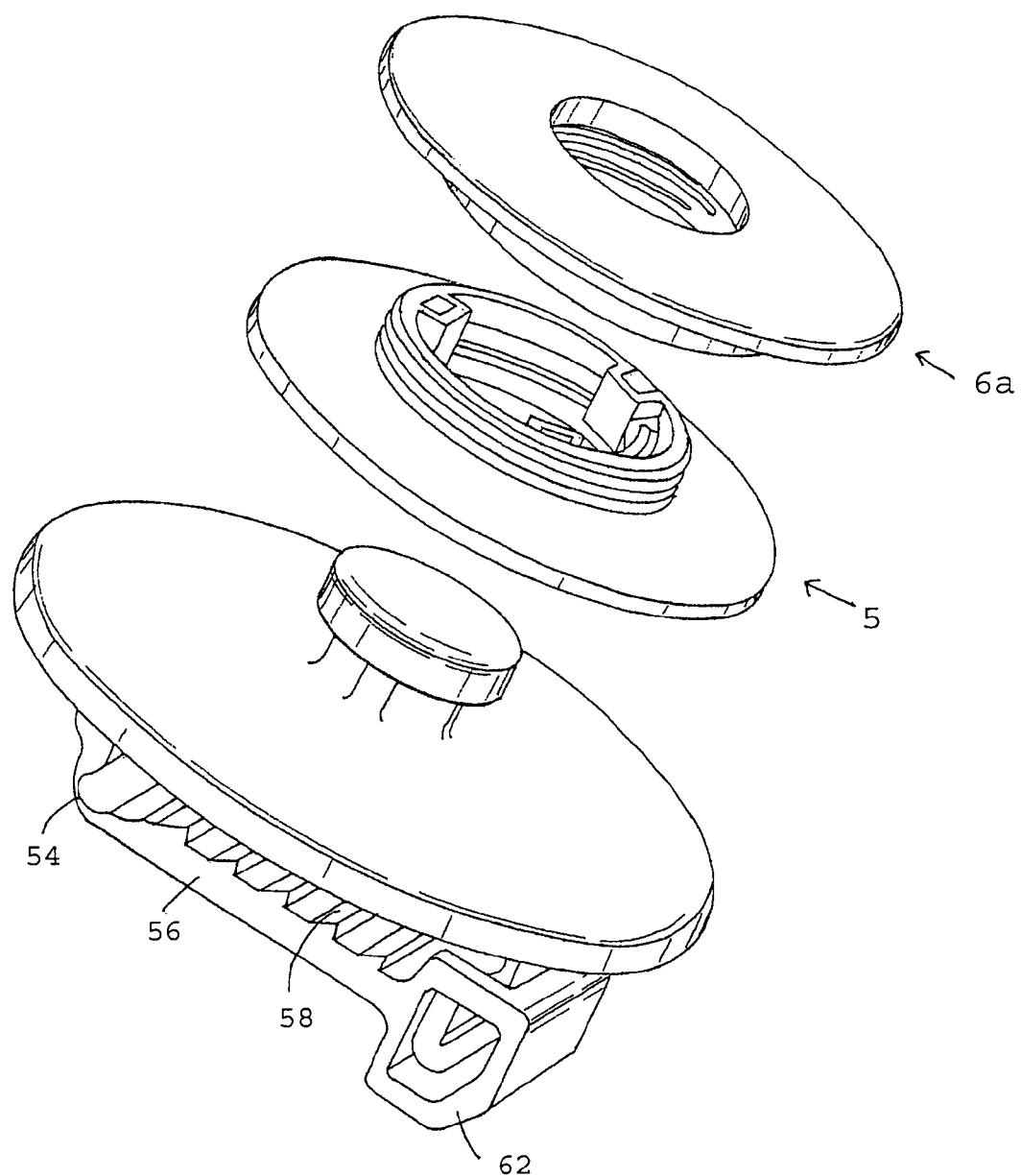
FIG. 14 is an exploded view of a second embodiment in a fixing position.
Figure 15:
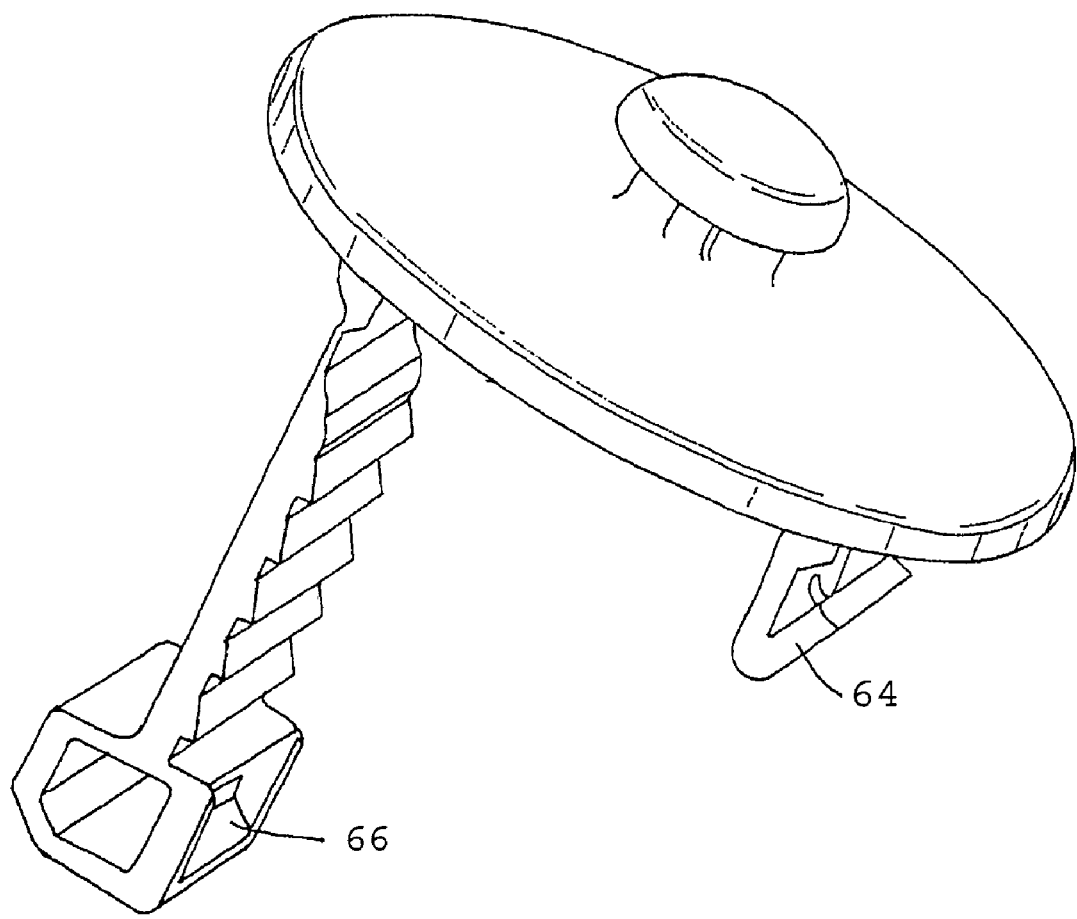
FIG. 15 is a perspective view of the base element of the second embodiment in a release position.
Figure 16:
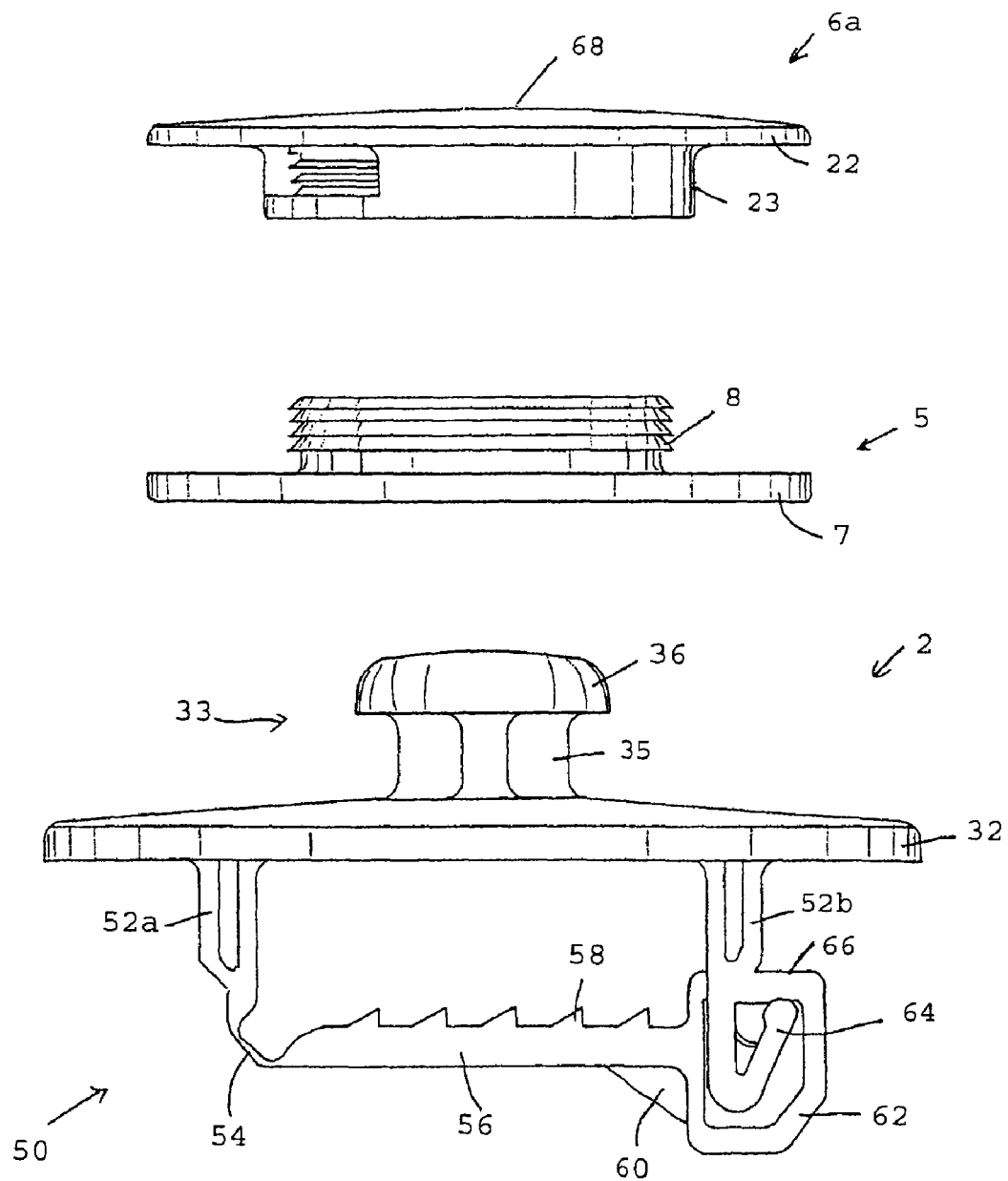
FIG. 16 is a left exploded view of the second embodiment in a fixing position.

In the second embodiment, as illustrated in FIGS. 14-16, female element 3 has the female eyelet 5 and a cap 6a which has the same structure of the cap 6 of the first embodiment discussed above except that the cap 6a further has a central circular orifice 68.

The base element 2 has a flange 32, the mushroom-shaped head 33 and a snap-over connection 50.

The flange 32 is flat and has a thickness corresponding to the thickness of the flange 7 and a diameter slightly more than that of the flange 7.

The snap-over connection 50 has two paralleled legs 52a, 52b fixed on a bottom of the flange 32, an arm 56 pivotally connected to the first leg 52a and lockable by snap action to the second leg 52b.

A height of the legs 52a, 52b is corresponding to a thickness of the floor carpet 4. One end of the first leg 52a is fixed to the bottom of the flange 32, and the other end of the first leg 52a has a thin flexible, bendable portion 54 connected to an end of the arm 56.

One end of the second leg 52b is fixed to the bottom of the flange 32, and the other end of the second leg 52b has a resilient hook 64.

In order to secure the base element 2 to the floor carpet 4, the arm 56 has a loop 62 engageable with the resilient hook 64 of the second leg 52. The loop 62 has three openings on a top surface, a left side surface and a right side surface, respectively. A top opening 66 is specifically to receive the resilient hook 64 when the arm 56 is snapped over the hook 64 to secure the floor carpet 4.

The arm 56 has a plurality of teeth 58 disposed on the upper surface of the arm 56 to grab the floor carpet 4 and further has a reinforcing rib member 60 transversely fixed on the bottom surface of the arm 56 along a center line thereof. In some arrangements, the entirety of the base element 2, including the flange 32, the mushroom-shaped head 33 and the snap-over connection 50, is integrally molded. In further arrangements, the base element 2 is molded in the open state as shown in FIG. 15 wherein the arm 56 and the hook 64 are not snapped together until the base element 2 is installed through the carpet 4.

Specifically, to fit the fastener for fixing the mat 26 to the carpet 4, the base element 2 is placed on the carpet 4 with the legs 52a, 52b passing through two orifices in the carpet 4. The section of the carpet 4 between the two orifices is uncut and will be gripped by the arm 56 when locked to hook 64. The arm 56 also passes through one of the orifices. The lower surface of the flange 32 comes into contact with the carpet 4. The arm 56 is bended to allow the teeth 58 of the arm 56 to contact with the bottom of the carpet 4 to keep the carpet 4 still and the hook 64 passed through the opening 66 of the loop 62. The hook 64 is deformed by an edge of opening 66, and springs back to engage the edge after the hook 64 has been completely received in the loop 62. As a result, the carpet 4 is secured by the snap-over connection 50.

The mat 26 is sandwiched between the cap 6a and the female eyelet 5 and then the female element 2 is positioned on the male element 3, as essentially discussed with respect to the first embodiment. The head 33 passes through the orifice of the mat 26 and is exposed on the mat 26.

There has been described a fastener with a base element fixed to a carpet and a female element fixed to a mat, but this fastener is generally suitable for a base element fixed to a first layer and a female element fixed to a second layer without prejudice as to the position or the nature of one of the layers relative to the other.

Although exemplary embodiments have been disclosed and discussed, it will be understood that other arrangement are possible and that the embodiments disclosed may be subjected to various changes, modifications, and substitutions without necessarily departing from the spirit of the present invention.

The invention claimed is:

1. Fastener for fixing a mat to a carpet, including:
    a base element including a male eyelet and a locking ring, said male eyelet having a flange, a mushroom-shaped head provided with an annular groove and projecting from a first side of said flange, and a skirt disposed on a second side of said flange opposite said first side, said flange being adapted to be positioned against a first face of said carpet, said locking ring having a flange adapted to be positioned against a second face of said carpet opposite said first face, said skirt and said ring including mutual attachment means for sandwiching said carpet between said flanges, and
    a female element including a female eyelet and a cap, said female eyelet having an annular rib and a flange extending radially around one end of said rib and being adapted to be positioned against a first face of said mat, said cap having a skirt and a flange projecting from said skirt and adapted to be positioned against a second face of said mat opposite said first face, said annular rib and said skirt including mutual attachment means for sandwiching said mat between their said respective flanges, said female element having a release position in which it is disposed away from said base element and a fixing position in which it is placed over said head of said base element, characterized in that said female element includes on the interior surface of said annular rib at least two studs projecting inward and deformable arms, each of said arms extending between two consecutive studs transversely to the direction of pushing said female element from said release position to said fixing position, each of said arms having a central portion disposed in said annular groove when said female element is in the fixing position on said base element, and each of said arms being adapted to be deformed during pushing so that they move apart and then locate in said annular groove.

2. Fastener according to claim 1, characterized in that said head includes a base and a cap delimiting said groove.

3. Fastener according to claim 2, characterized in that, in the female eyelet, said arms are disposed at substantially the same level as said flange.

4. Fastener according to claim 3, characterized in that each of said studs has a front surface parallel to said interior surface and spaced from that interior surface and a transverse surface adjoining said flange, the corner formed between said front surface and said transverse surface being rounded.

5. Fastener according to claim 4, characterized in that the thickness of each of said studs between said interior surface and said front surface is determined so that said head when said female element passes from said release position to said fixing position.

6. Fastener according to claim 4, characterized in that each of said studs has two lateral surfaces, each disposed between said interior surface of said rib and said front surface, each of said arms being rooted at each end on one of said lateral surfaces.

7. Fastener according to claim 6, characterized in that each end of each of said arms is further rooted on a portion of said interior surface adjacent to said lateral surface on which that end is also rooted.

8. Fastener according to claim 1, characterized in that said female eyelet is in one piece.

9. Fastener according to claim 1, characterized in that said interior surface of said skirt of said cap and said exterior surface of said rib of said female eyelet each have a series of notches belonging to said mutual attachment means of said female element.

10. Fastener according to claim 1, characterized in that each of said arms has a half-moon-shaped cross section, the face that is straight when seen in section facing said interior face, the face that is curved when seen in section being disposed opposite said straight face.

11. Fastener according to claim 1, characterized in that said female eyelet includes three studs regularly distributed over said interior surface of said annular rib.

12. Fastener according to claim 11, characterized in that each of said arms is slightly curved, with its convex side facing said interior surface.

13. Fastener according to claim 1, characterized in that said flange of said ring extends around a central orifice, said ring also having on its perimeter bordering said central orifice a series of teeth having a pointed end projecting inwards, and in that the exterior surface of said skirt of said male eyelet has a plurality of notches extending parallel to each other and to said flange, said mutual attachment means of said base element including said teeth and said notches.

14. Fastener according to claim 1, characterized in that said locking ring, said male eyelet, said female eyelet and said cap are each molded in one piece from plastic material.

15. A fastener for fixing a mat to a carpet comprising:
    a female element having a cap and a female eyelet to sandwich said mat therebetween;
    a base element engageable with the female element and including a snap-over connection to fasten said carpet on the base element, wherein
    the base element further comprises a flange positioned against a first surface of the carpet;
    the female element further comprises a flange faced a second surface of the mat;
    the snap-connection further comprises:
    first and second legs fixed to the bottom of the flange; and
    an arm pivotally attached to an end of the first leg and engageable with said second leg so that the carpet is secured by the snap connection.

16. The fastener according to claim 15, wherein the arm further comprises teeth mounted on the upper face of the arm to engage the carpet.

17. The fastener according to claim 16, wherein the end of the first leg is connected with the arm by a flexible portion which is bendable to allow the arm to pivot about that end.

18. The fastener according to claim 17, wherein the second leg has a resilient hook receivable via snap action in a loop mounted on an end of the arm.

19. A fastener for fixing a mat to a carpet comprising:
a female element having a cap and a female eyelet to sandwich said mat therebetween;
a base element engageable with the female element and including a carpet holding arrangement for holding said carpet;
wherein
the base element comprises an enlarged head provided with an annular groove;
the female eyelet comprises
at least two studs projecting inward, and
deformable arms each of which extends between two adjacent said studs transversely to a direction of pushing said head of the base element into said female eyelet, each of said arms having a central portion disposed in said annular groove when said female element is engaged with the base element.

* * * * *